US010042389B2

(12) United States Patent
Hsieh et al.

(10) Patent No.: US 10,042,389 B2
(45) Date of Patent: Aug. 7, 2018

(54) CARRYING STRUCTURE FOR CARRYING ELECTRONIC DEVICE

(71) Applicant: WISTRON CORPORATION, Taipei Hsien (TW)

(72) Inventors: Shin-Yi Hsieh, Taipei Hsien (TW);
Ping-Sheng Yeh, Taipei Hsien (TW);
Chia-Sheng Lin, Taipei Hsien (TW);
Ko-Hsien Lee, Taipei Hsien (TW);
Cheng-Tang Chang, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 590 days.

(21) Appl. No.: 14/255,134

(22) Filed: Apr. 17, 2014

(65) Prior Publication Data

US 2015/0098181 A1    Apr. 9, 2015

(30) Foreign Application Priority Data

Oct. 3, 2013 (TW) .............................. 102135921 A (51) Int. Cl.
*G06F 1/16* (2006.01)

(52) U.S. Cl.
CPC .......... *G06F 1/1632* (2013.01); *G06F 1/1628* (2013.01)

(58) Field of Classification Search
CPC ............................ G06F 1/1632; G06F 1/1628
USPC ........................ 361/679.41–679.44
See application file for complete search history.

(56) References Cited

U.S. PATENT DOCUMENTS

| 6,216,195 | B1* | 4/2001 | Lee | G06F 1/1632 |
| | | | | 361/679.41 |
| 7,817,414 | B2* | 10/2010 | Chou | G06F 1/1632 |
| | | | | 361/679.41 |
| 9,192,067 | B2* | 11/2015 | Kim | G06F 1/1632 |

(Continued)

FOREIGN PATENT DOCUMENTS

TW        200840455 A    10/2008

OTHER PUBLICATIONS

Communication From the Taiwan Patent Office Regarding a Counterpart Foreign Application Dated (Taiwan Year 105) Feb. 18, 2016.
(Continued)

*Primary Examiner* — Binh Tran
*Assistant Examiner* — Douglas Burtner
(74) *Attorney, Agent, or Firm* — Rosenberg, Klein & Lee (57) ABSTRACT

The present disclosure provides a carrying structure for carrying electronic device. The carrying structure comprises a carrying base, a start-up member, a linkage module, a latch member, a first buckle member, and a releasing member. When an electronic device is disposed to the carrying base, the electronic device drives the start-up member, which drives the latch member via the linkage module so that the latch member can fix the electronic device to the carrying base. To disassemble the electronic device from the carrying base, press the releasing member, which pushes the first buckle member and makes the latch member depart from the first buckle member and restore to the original position. Consequently, the start-up member and the linkage module can restore to the original positions. Thereby, the effects of rapid assembling and disassembling can be achieved.

16 Claims, 13 Drawing Sheets

(56) References Cited

U.S. PATENT DOCUMENTS

2004/0004809 A1* 1/2004 Mochizuki ............ G06F 1/1632
   361/679.2
2004/0145864 A1* 7/2004 Usui ..................... G06F 1/1632
   361/679.41
2010/0265652 A1* 10/2010 Agata ................... G06F 1/1632
   361/679.41

OTHER PUBLICATIONS

Communication From Foreign Patent Office in Counterpart Foreign Patent Application.

* cited by examiner

CARRYING STRUCTURE FOR CARRYING ELECTRONIC DEVICE

FIELD OF THE DISCLOSURE

The present disclosure relates generally to a carrying structure, and particularly to a carrying structure for carrying electronic device.

BACKGROUND OF THE DISCLOSURE

As technologies advance, tablet computers and smartphones have become the mainstream in the development of portable electronic products due to their advantages of lightness and small size, touch operations, and ease of carrying. Thereby, they have been replacing gradually traditional notebook computers. When a user uses a tablet computer, he has to hold it by a hand and maintain the display of the tablet computer vertical or tilted for viewing. Compared with traditional notebook computers whose displays can be kept vertical or tilted while being placed levelly on tables or laps, the usage of tablet computers does not comply with a user's viewing habit and ergonomics. Accordingly, in order to enable tablet computers to be used on tables or laps, many carrying structures are developed currently for carrying tablet computers.

Unfortunately, part of current carrying structures does not include the function of fixing tablet computers. Although users can place tablet computers on them and remove tablets from them easily, the tablet computers tend to fall off from the carrying structure as the users click and displace them. Certainly, there are carrying structures capable of fixing tablet computers. Nonetheless, the procedure of assembling or disassembling tablet computers is complicated and requires both hands for operating the carrying structures, leading to inconvenience for users.

Accordingly, the present disclosure provides a carrying structure for carrying electronic device, which includes the function of fixing the electronic device and achieving the effect of rapid assembling and disassembling. Thereby, the usage convenience for users is enhanced substantially.

SUMMARY

An objective of the present disclosure is to provide a carrying structure for carrying electronic device, which can be used for carrying an electronic device, and enables rapid assembling of the electronic device to the carrying structure and rapid disassembling of the electronic device from the carrying structure.

Another objective of the present disclosure is to provide a carrying structure for carrying electronic device, which can be operated single-handedly for solving users' inconvenience effectively in usage.

For achieving the objectives and effects described above, the present disclosure discloses a carrying structure for carrying electronic device, which comprises a carrying base, a start-up member, a linkage module, and a latch member. The carrying base includes a carrying surface, a supporting surface, and an accommodating space. The start-up member is disposed in the accommodating space and includes at least one start-up part penetrating at least one first hole of the carrying surface. The linkage module is connected with the start-up member. The latch member is connected with the linkage module and includes at least one latch part. When an electronic device is disposed on the carrying surface and presses the start-up part, the start-up part drives the start-up member, which drives the latch member via the linkage module. The latch part projects from the supporting surface and buckles to at least one fixing part of the electronic device for carrying and fixing the electronic device to the carrying base.

DETAILED DESCRIPTION

In order to make the structure and characteristics as well as the effectiveness of the present disclosure to be further understood and recognized, the detailed description of the present disclosure is provided as follows along with embodiments and accompanying figures.

The carrying structure for carrying electronic device according to the prior art cannot fix the electronic device thereon. When a user is using the electronic device, it tends to fall off from the carrying structure. Alternatively, the carrying structure has the function of fixing the electronic device. Nonetheless, the procedure of assembling or disassembling the electronic device is complicated and requires both hands for operating. Accordingly, the present disclosure provides a carrying structure for carrying electronic device, which enables rapid fixing of the electronic device to the carrying structure and rapid and easy disassembling of the electronic device from the carrying structure. In addition, assembling and disassembling can be performed by operating the carrying structure single-handedly, and thus solving users' inconvenience effectively in usage.

Figure 1:
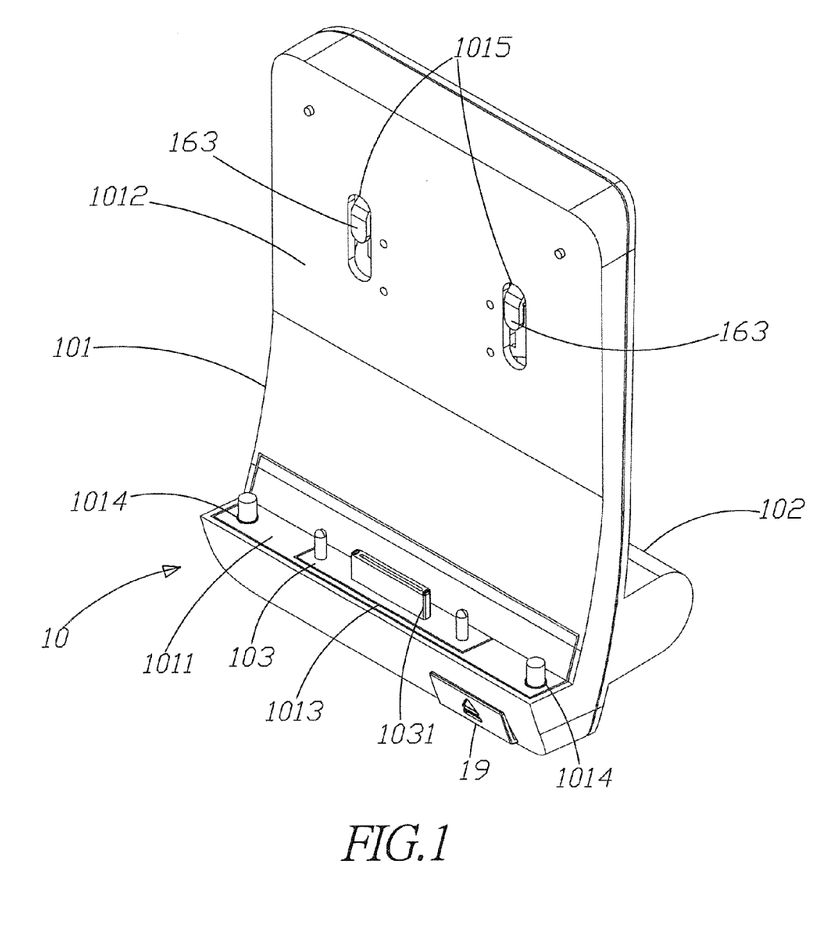
FIG. 1 shows a schematic diagram of the carrying structure according the first embodiment of the present disclosure.
Figure 2:
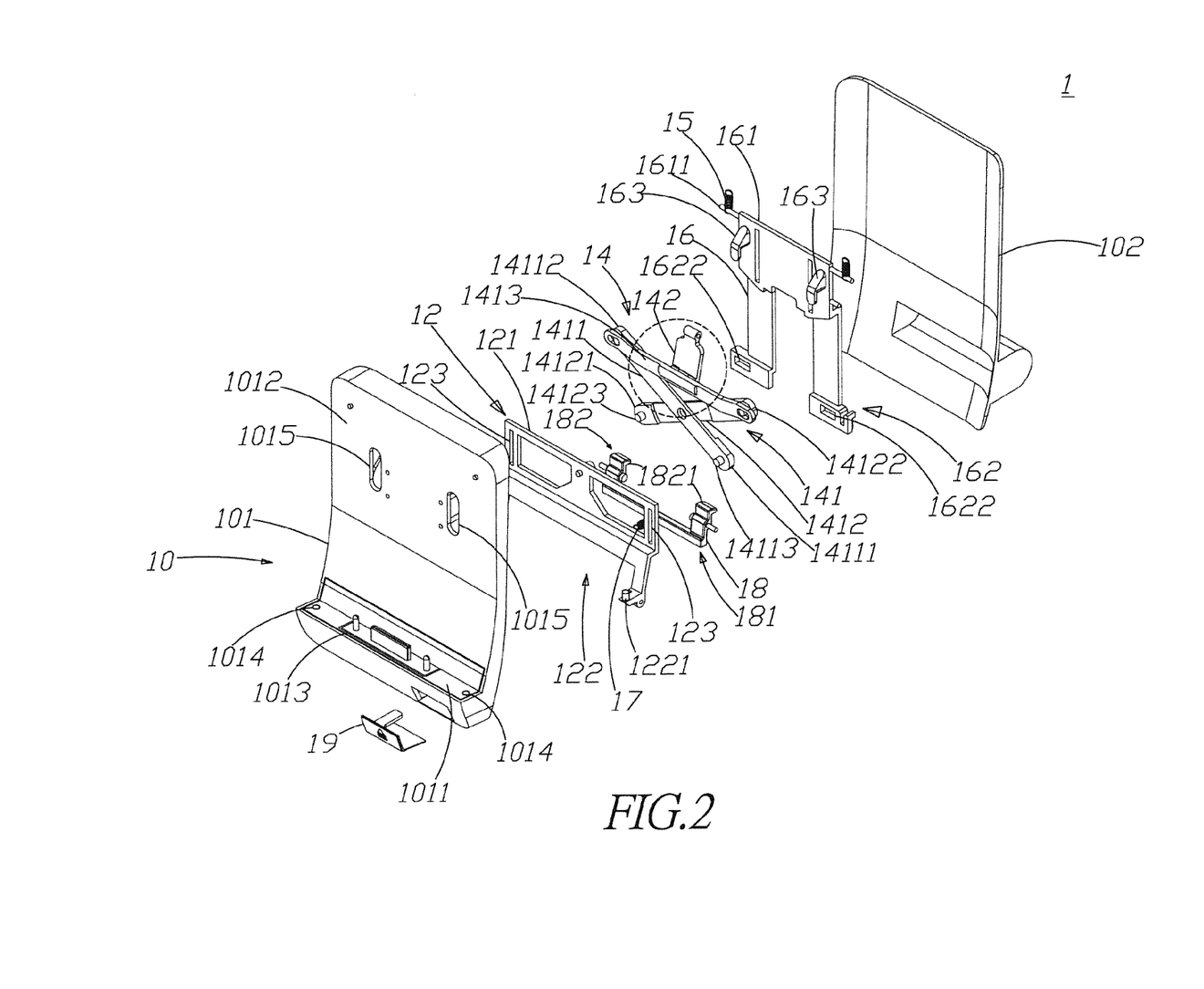
FIG. 2 shows an assembly diagram of the carrying structure according the first embodiment of the present disclosure.
Figure 3:
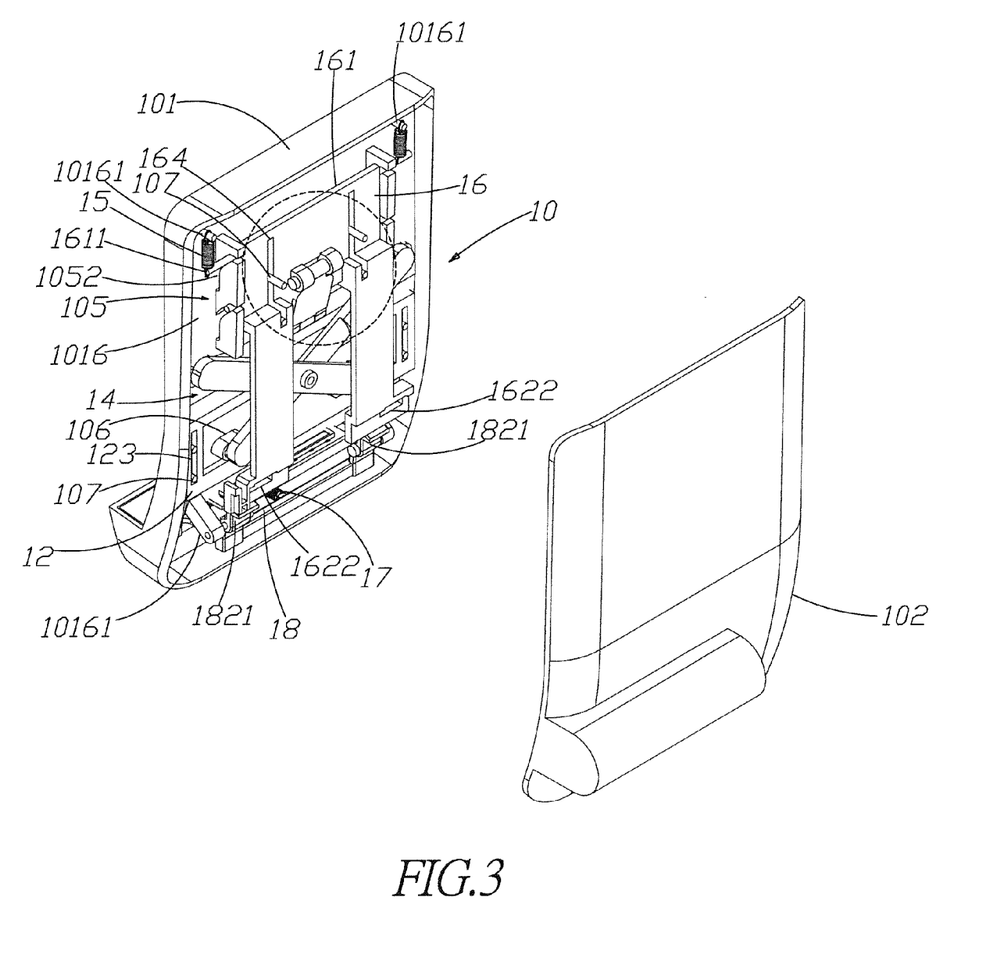
FIG. 3 shows another assembly diagram of the carrying structure according the first embodiment of the present disclosure.
Figure 4:
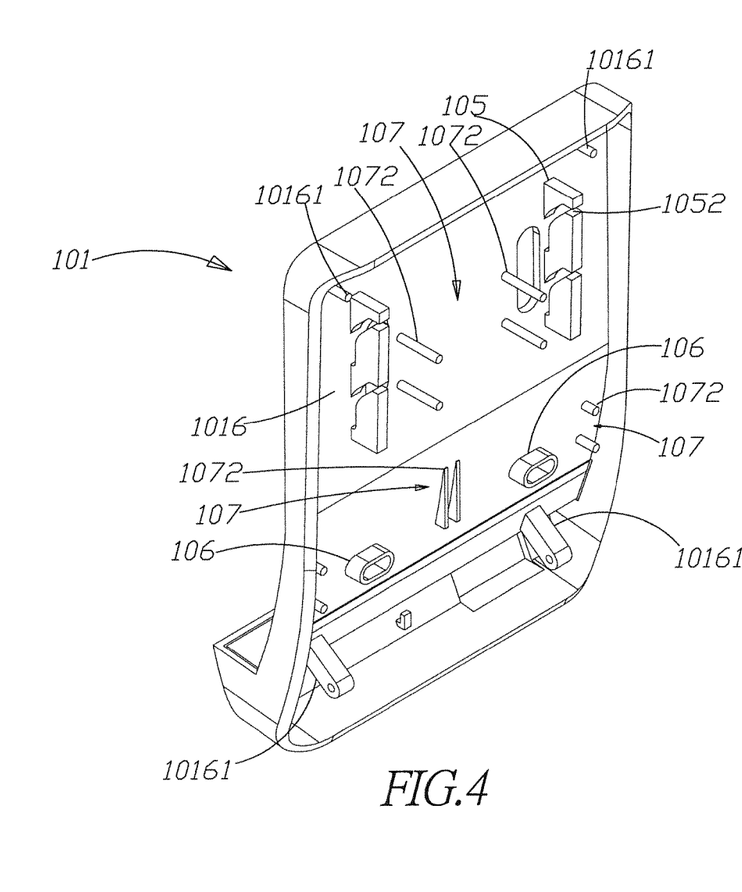
FIG. 4 shows a schematic diagram of the front cover according the first embodiment of the present disclosure.
Figure 5A:
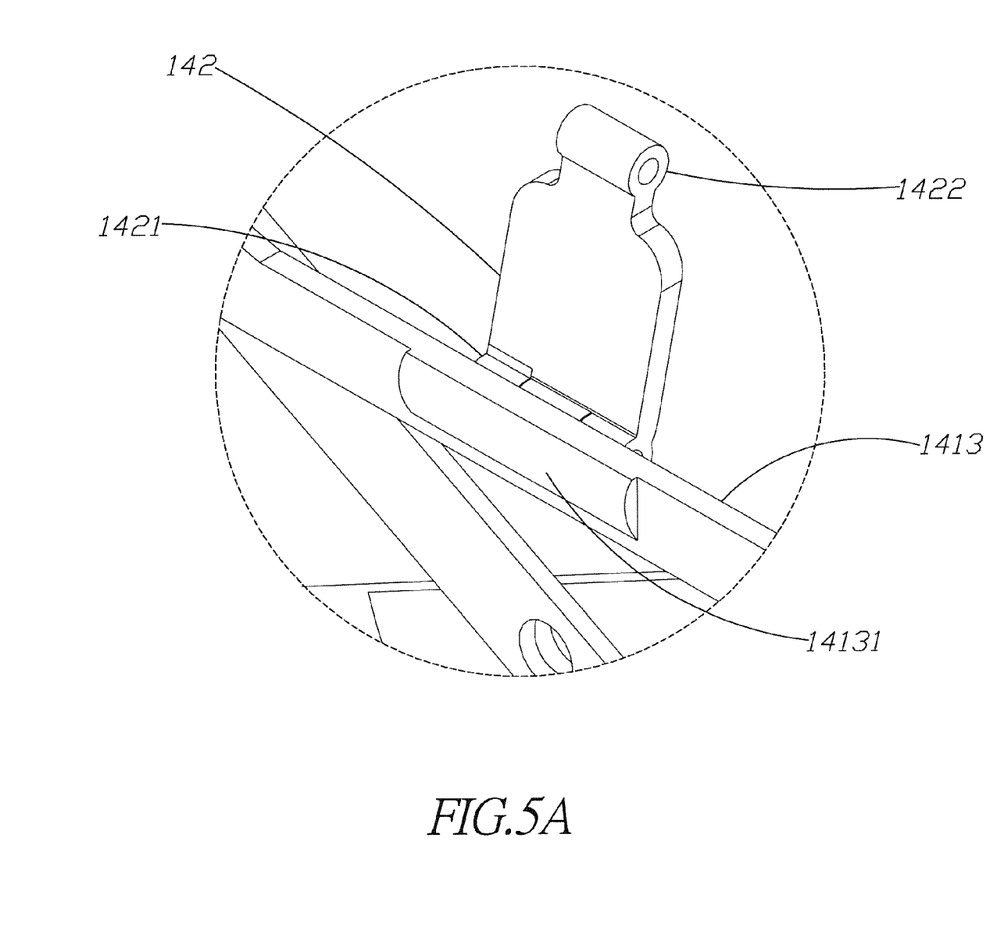
FIG. 5A shows a partially enlarged view of FIG. 2 according the first embodiment of the present disclosure.
Figure 5B:
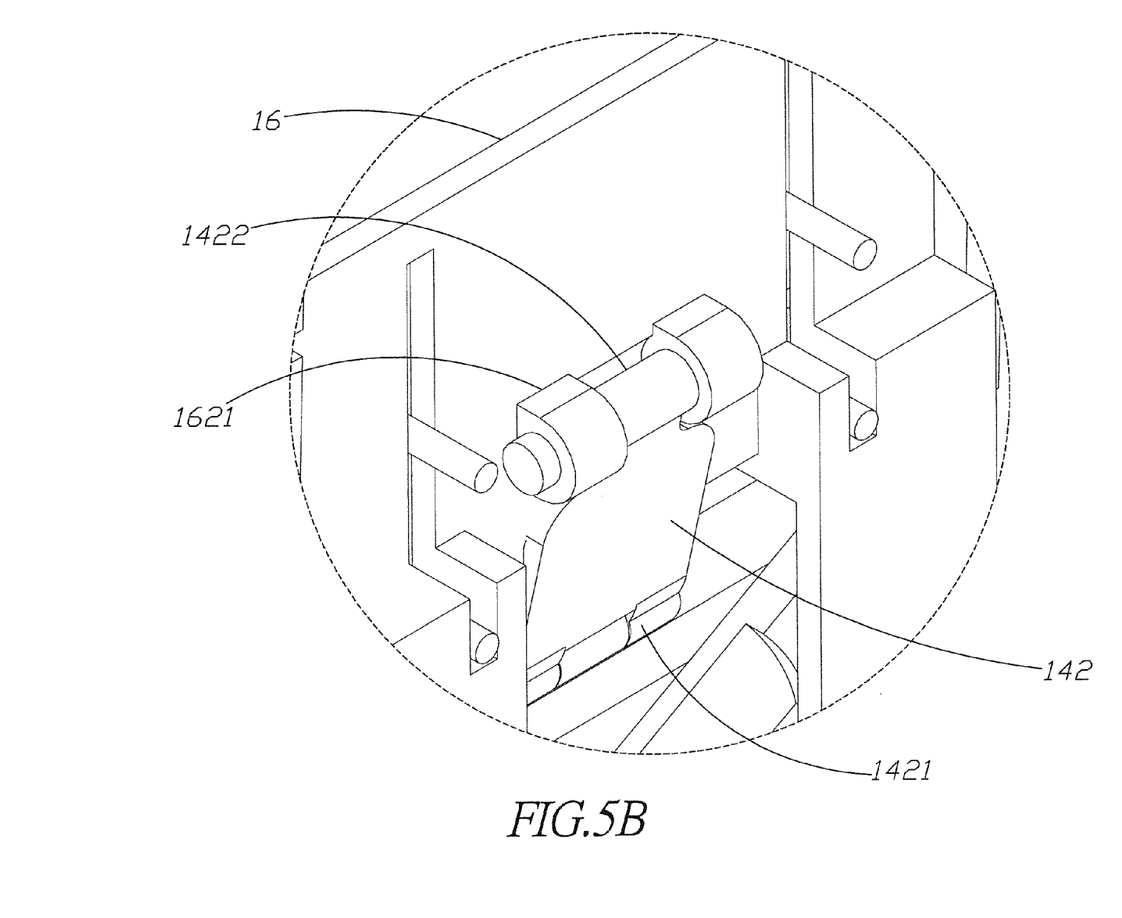
FIG. 5B shows a partially enlarged view of FIG. 3 according the first embodiment of the present disclosure.
Figure 6A:
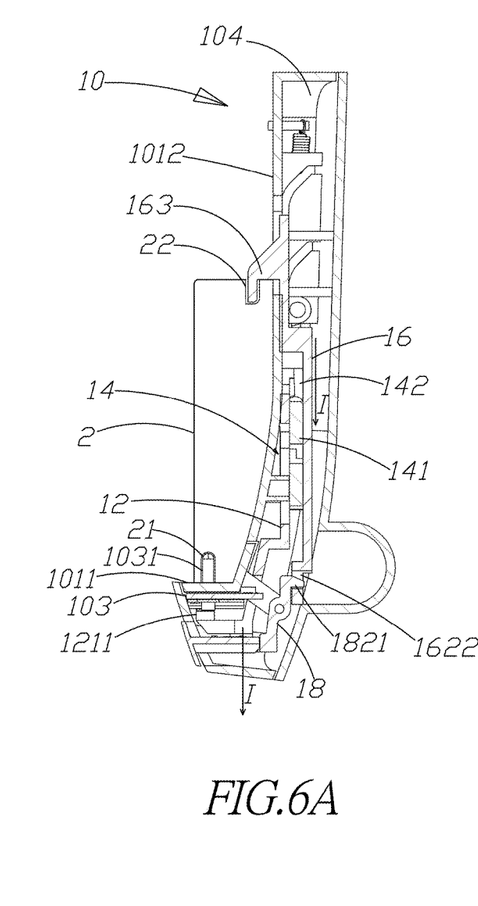
FIGS. 6A to 6D show usage diagrams of the carrying structure according the first embodiment of the present disclosure.

Please refer to FIG. 1 to FIG. 5B, which show a schematic diagram, an assembly diagram, and a schematic diagram of the front cover of the carrying structure according to the first embodiment of the present disclosure and show partially enlarged diagrams of FIG. 2 and FIG. 3. As shown in the figure, the present embodiment provides a carrying structure 1 for carrying electronic device, which comprises a carrying base 10, a start-up member 12, a linkage module 14, a latch member 16, a first buckle member 18, and a release member 19. The carrying base 10 includes a front cover 101 and a back cover 102. The front cover 101 has a carrying surface 1011 and a supporting surface 1012. The carrying surface 1011 has an installation hole 1013 and two first holes 1014. The two first holes 1014 are located on both sides of the installation holes 1013. The installation hole 1013 is provided for disposing an electrical connecting module 103. Besides, the supporting surface 1012 has two second holes 1015. The back cover 102 is assembled on the front cover 101. There is an accommodating space 104 between the front cover 101 and the back cover 102, as shown in FIG. 6A. The accommodating space 104 is used for accommodating the start-up member 12, the linkage module 14, the latch member 16, and the first buckle member 18.

Refer again to FIG. 2. The start-up member 12 has a first end 121 and a second end 122. The second end 122 of the start-up member 12 has two start-up parts 1221. According to the present embodiment, the two start-up parts 1221 are projective pillars penetrating the two first holes 1014 of the carrying surface 1011 and projecting the carrying surface 1011, as shown in FIG. 1. The latch member 16 is located behind the supporting surface 1012 and includes a first end 161 and a second end 162. The first end 161 of the latch member 16 has at least one first elastic member 15 connecting to the first end 161 of the latch member 16 and a projective rib 10161 on the inner surface 1016 of the carrying base 10, as shown in FIG. 3, for fixing the latch member 16 in the carrying base 10. The latch member 16 has two latch parts 163 disposed in two second holes 1015 of the supporting surface 1012.

The linkage module 14 is connected with the first end 121 of the start-up member 12 and the second end 162 of the latch member 16. The linkage module 14 according to the present embodiment has a telescopic mechanism 141 and a first connecting rod 142. The telescopic mechanism 141 includes a second connecting rod 1411, a third connecting rod 1412, and a pivot rod 1413. The center of the second connecting rod 1411 is disposed at the center of the third connecting rod 1412 and they are arranged in a cross. The second connecting rod 1411 has a first end 14111 and a second end 14112; the third connecting rod 1412 has a first end 14121 and a second end 14122. The first end 14111 of the second connecting rod 1411 and the first end 14121 of the third connecting rod 1412 are located on the same side; the second end 14112 of the second connecting rod 1411 and the second end 14122 of the third connecting rod 1412 are located on the same side and opposing to the first end 14111 of the second connecting rod 1411 and the first end 14121 of the third connecting rod 1412. Both ends of the pivot rod 1413 are connected to the second end 14112 of the second connecting rod 1411 and the second end 14122 of the third connecting rod 1412, respectively. The pivot rod 1413 also includes a first pivot part 14131, as shown in FIG. 5A. Moreover, the front cover 101 of the carrying base 10 further includes two limiting parts 106 on the inner surface 1016, as shown in FIG. 3. The first end 14111 of the second connecting rod 1411 and the first end 14121 of the third connecting rod 1412 include second positioning parts 14113, 14123, respectively, for disposing the two limiting parts 106 and limiting the movement of the second and third connecting rods 1411, 1412.

The first end 121 of the start-up member 12 is disposed at the center of the telescopic mechanism 141, namely, the intersection of the second and third connecting rods 1411, 1412. Please refer to FIGS. 3 to 5B. The first connecting rod 142 has a first end 1421 and a second end 1422. The first end 1421 of the first connecting rod 142 is connected pivotally to the first pivot part 14131 of the pivot rod 1413. The latch member 16 has a second pivot part 1621. The second end 1422 of the first connecting rod 142 is connected pivotally to the second pivot part 1621 of the latch member 16.

In addition, the first buckle member 18 is connected pivotally to the two projective ribs 10161 on the inner surface of the front cover 101, respectively. The first buckle member 18 has a first end 181 and a second end 182. The second end 182 includes two hooks 1821 used for hooking to two first fixing parts 1622 of the second end 162 of the latch member 16 for fixing the latch member 16. The release member 19 is disposed at the front cover 101 of the carrying base 10 and against the first end 181 of the first buckle member 18. When the release member 19 is pushed, it pushes the first buckle member 18 and enables the first buckle member 18 to rotate about the two projective ribs 10161 for releasing the latch member 16. The first end 181 of the first buckle 18 further has a second elastic member 17 connected to the inner surface 1016 of the carrying base 10, as shown in FIG. 6D.

Figure 6B:
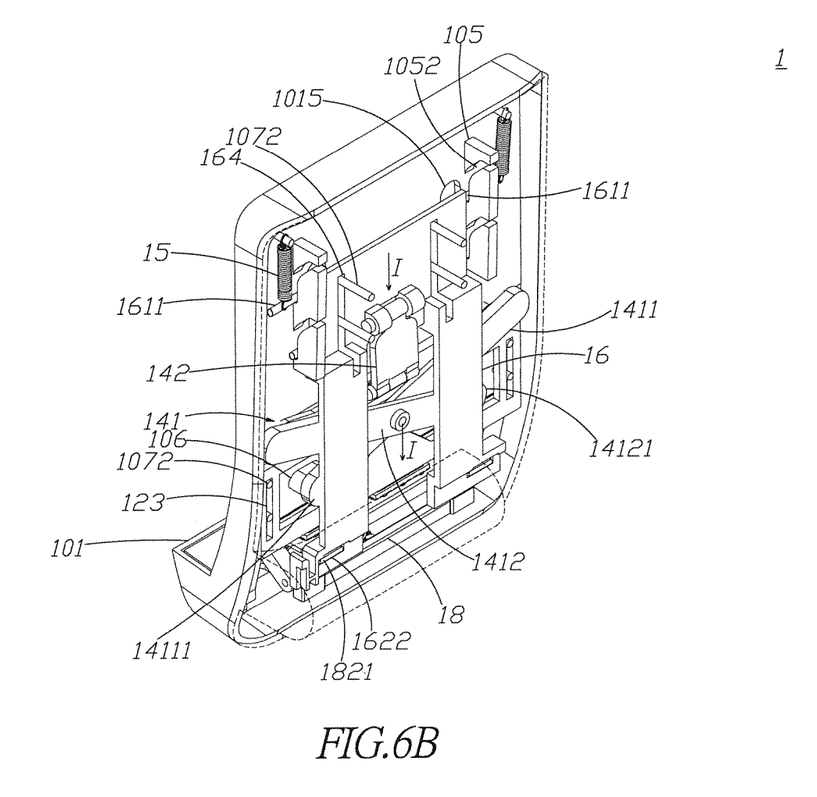

Please refer to FIGS. 6A and 6B, which show usage diagrams of the carrying structure according the first embodiment of the present disclosure. As shown in FIG. 6A, when an electronic device 2 is disposed on the carrying structure 1, the electronic device 2 has an electrical connecting port 21 inserting to a first electrical connecting port 1031 of the electrical connecting module 103 and pressing the two start-up parts 1221 of the start-up member 12 to move towards the bottom of the start-up member 12, namely, towards a first direction I. The start-up member 12 drives the telescopic mechanism 141 of the linkage module 14 to move towards the first direction I, as shown in FIG. 6A. As the telescopic mechanism 141 moves towards the first direction I, the second positioning part at the first end 14111 of the second connecting rod 1411 of the telescopic mechanism 141 and the second positioning part at the first end 14121 of the third connecting rod 1412 move in the corresponding limiting parts 106, respectively. Then the first end 14111 of the second connecting rod 1411 and the first end 14121 of the third connecting rod 1412 move away from each other, making the telescopic mechanism 141 contract towards the first direction I. Meanwhile, the contracting telescopic mechanism 141 drives the first connecting rod 142 to move towards the first direction I. The latch member 16 elongates the two first elastic members 15. The latch parts 163 of the latch member 16 penetrate the two second holes 1015 of the supporting surface 1012 and are wedged to the two fixing parts 22 of the electronic device 2. Thereby, the electronic device 2 is fixed to the carrying base 10. The carrying surface 1011 carries the bottom of the electronic device 2 and the supporting surface 1012 supports the electronic device 2.

Figure 6C:
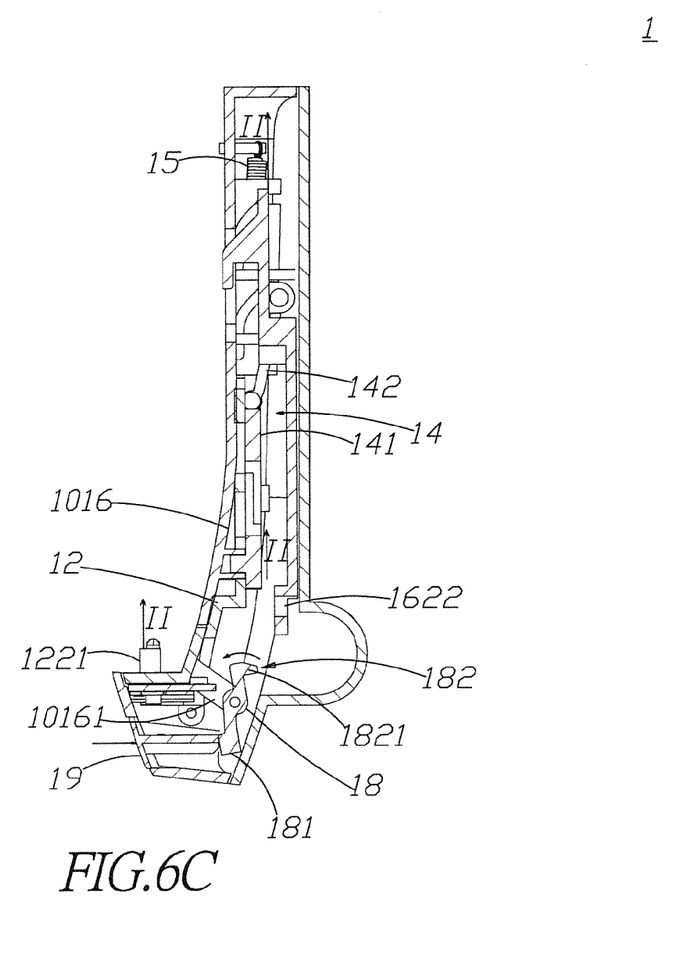
Figure 6D:
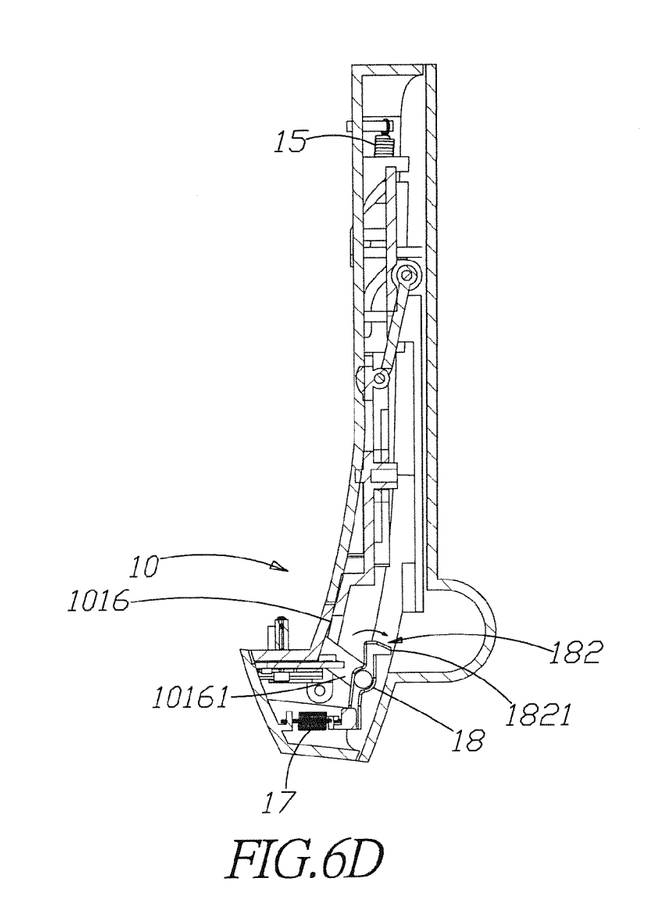

Please refer to FIGS. 6C and 6D, which show other usage diagrams of the carrying structure according the first embodiment of the present disclosure. As shown in the figures, FIG. 2 shows the status of the electronic device 2 fixed on the carrying structure 1, and the present embodiment shows the status of the electronic device 2 disassembled from the carrying structure 1. While disassembling the electronic device 2 from the carrying structure 1, the user presses the releasing member 19 from outside of the carrying base 10. The releasing member 19 pushes the first end 181 of the first buckle member 18. The second end 182 of the first buckle member 18 rotates about the two projective ribs 10161 on the inner surface 1016 and makes the two hooks 1821 of the first buckle member 18 depart from the two first fixing parts 1622 of the latch member 16. The two elongated first elastic members 15 generate a counterforce, respectively. For driving the match member 16 to move towards a second direction II and restore to the original position, which drives the linkage module 14 and the start-up member 12 to move towards the second direction II and restore to the original positions. In addition, when the releasing member 19 pushes the first buckle member 18, the second elastic member 17 is elongated. After the latch member 16 restores to the original position, the user stops pressing the releasing member 19. The releasing member 19 stops pushing the first buckle member 18. The elongates second elastic member 17 generates a counterforce for pulling the first end 181 of the first buckle member 18 and restoring the two hooks 1821 of the first buckle member 18 to the original positions.

Figure 7:
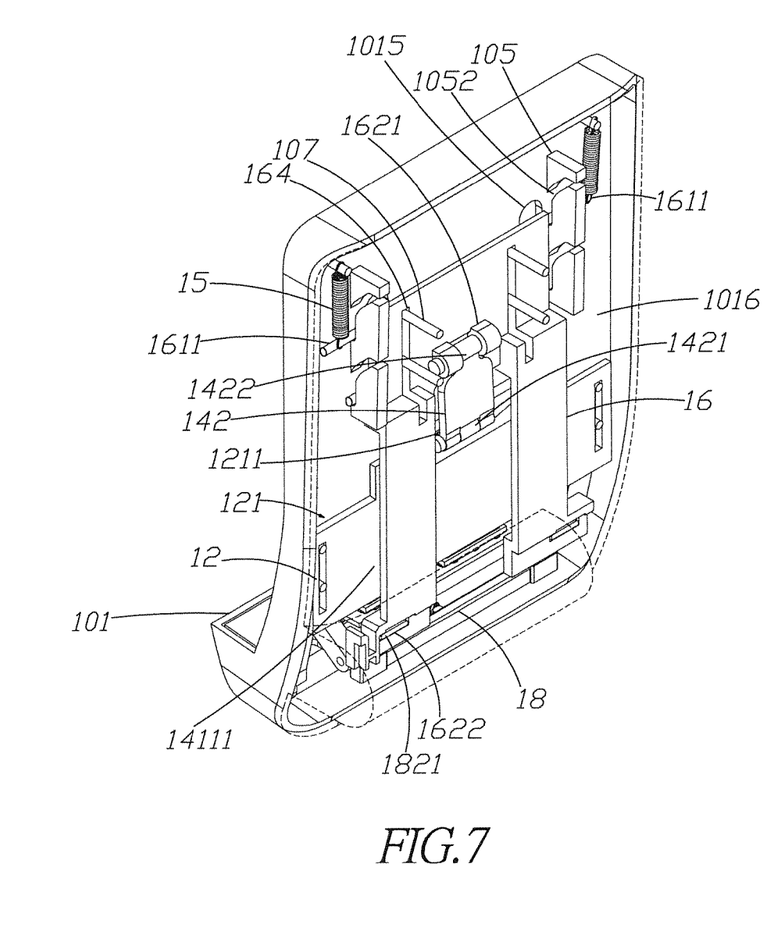
FIG. 7 shows a schematic diagram of the carrying structure according the second embodiment of the present disclosure.

The linkage module 14 according to the present embodiment adopts the telescopic mechanism 141. As the start-up member 12 moves by a first distance, the start-up member 12 drives the latch member 16 to move by a second distance via the linkage module 14. The second distance is twice as long as the first distance for making the process of assembling the electronic device 2 to the carrying structure 1 or disassembling the electronic device 2 from the carrying structure 1 more smoothly. The telescopic mechanism 141 achieves the above function by mainly controlling the lengths of the second and third connecting rods 1411, 1412. Please refer to FIG. 7. If the moving distances of the start-up member 12 and the latch member 16 are the same, the telescopic mechanism 141 can certainly be omitted. In this case, the first end 1421 of the first connecting rod 142 is connected pivotally to a third pivot part 1211 at the first end 121 of the start-up member 12, and the second end 1422 of the first connecting rod 142 is connected pivotally to the second pivot part 1621 of the latch member 16. Thereby, the start-up member 12 can use the first connecting rod 142 to drive directly the latch member 16. Then the two latch parts of the latch member 16 can also hook to the two fixing parts 22 of the electronic device 2.

Refer again to FIG. 4 and FIG. 6B. For preventing the start-up member 12 and the latch member 16 not moving to the correct moving positions, two first guiding members 101 and three second guiding members 107 are disposed on the inner surface 1016 opposing to the supporting surface 1012. Each first guiding member 105 has at least one first guiding part 1052. According to the present embodiment, the first guiding part 1052 is a groove. Besides, the latch member 16 includes a first ends 161 and a second end 162. The first end 161 of the latch member 16 has two first positioning parts 1611. The two first positioning parts 161 are projective pillars penetrating the corresponding first guiding parts 1052, respectively, for supporting the latch member 16 in the accommodating space 104. Moreover, the second guiding member 107 has at least one second guiding part 1072; the start-up member 12 has two start-up positioning parts 123; the latch member 16 has a latch positioning part 164. The second guiding part 1072 according to the present embodiment is a projective pillar. The start-up positioning part 123 and the latch positioning part 164 is a groove. Thereby, the second guiding part 1072 of each second guiding member 107 is disposed at the corresponding start-up positioning part 123 and the latch positioning part 164.

When the start-up member 12 moves towards the first direction I or the second direction II, it moves along the two second guiding members 107 for avoiding deviation from the original moving position. When the latch member 16 moves towards the first direction I, the two first positioning parts 1611 of the latch member 16 move along the two first guiding parts 1052 of the two first guiding members 105. The two first guiding members 105 guide the two latch parts 163 of the latch member 16 to hook to the two fixing parts 22 of the electronic device 2, as shown in FIG. 6A. When the latch member 16 moves towards the second direction II, the two first positioning parts 1611 of the latch member 16 moves along the two first guiding parts 1052 of the two first guiding members 105. The two first guiding members 106 guide the latch member 16 to restore to the original position for avoiding deviation from the original moving position. The function of the second guiding member 107 is the same as that of the first guiding member 105. Hence, the details will not be described again.

Figure 8A:
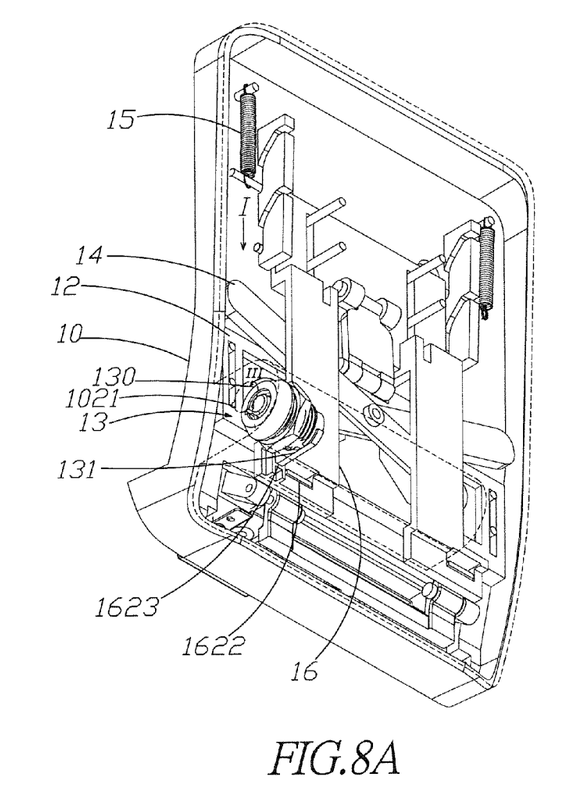
FIGS. 8A and 8B show usage diagrams of the carrying structure according the third embodiment of the present disclosure.
Figure 8B:
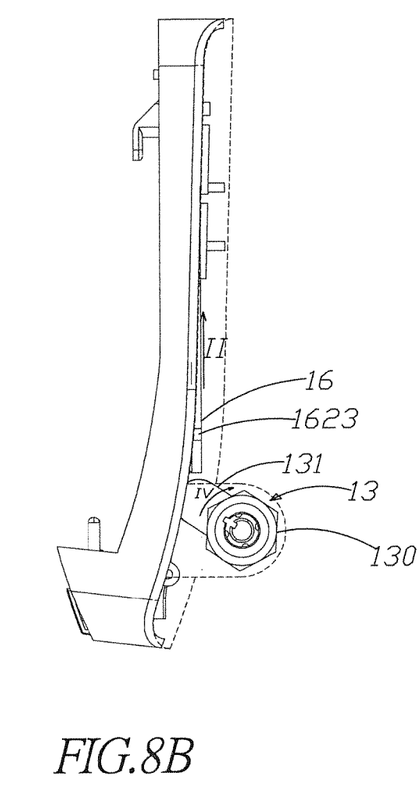

Please refer to FIGS. 8A and 8B, which show usage diagrams of the carrying structure according the third embodiment of the present disclosure. As shown in the figures, the carrying structure 1 according to the present embodiment further comprises a second buckle member 13 disposed in the carrying base 10 and including an operating part and a second latch part 131 connected with the operating part 130. The operating part 130 and the second latch part 131 are located in the carrying base 10. The carrying base 10 has a locking hole 1021 on the back cover 102. The locking hole 1021 corresponds to the operating part 130. Besides, the latch member 16 has a second fixing part 1623 located on one side of the first fixing part 1622. The second latch part 131 corresponds to the second fixing part 1623.

When the first buckle member 18 fixes the latch member 16, the user passes a tool through the locking hole 1021. The tool is against the operating part 130 and driving the operating part 130 to turn in a third —direction III. The operating part 130 drives the second latch part 131 to turn in the third direction III. The second latch part 131 is wedged to the second fixing part 1623 of the latch member 16 for fixing the latch member 16 again and hence preventing the latch member 16 from departing from the first buckle member 18. When the latch member 16 is to restore to the original position, the user first uses the tool to turn the operating part 130 in a fourth direction IV. Then the operating part 130 drives the second latch part 131 to turn in the fourth direction IV and making the second latch part 131 depart from the second fixing part 1623 of the latch member 16. Next, the releasing member 19 is used for pushing the first buckle member 18 and making the latch member 16 depart from the first buckle member 18 and restore to the original position using the elasticity of the first elastic member 15. Meanwhile, the start-up member 12 is driven to restore to the original position via the linkage module 14.

To sum up, the present disclosure provides a carrying structure for carrying electronic device. The carrying structure mainly comprises the start-up member, the linkage module, and the latch member in the carrying base for fixing the electronic device to the carrying base rapidly and disassembling the electronic device from the carrying base rapidly. The linkage module uses the telescopic mechanism, so that the moving speed of the match member is twice the moving speed of the start-up member, so that the latch member can fix or disassemble the electronic device smoothly.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. A carrying structure for carrying electronic device, comprising:
   a carrying base having a carrying surface, a supporting surface, and an accommodating space;
   a start-up member disposed in said accommodating space, and having at least one start-up part penetrating at least one first hole of said carrying surface;
   a linkage module connected with said start-up member;
   a latch member connected with said linkage module, and having at least one latch part;
   a first buckle member disposed in said accommodating space, and connected pivotally to said carrying base, and having at least one hook hooking at least one first fixing part of said latch member; and
   a releasing member disposed at said carrying base, against said first buckle member, pushing said first buckle member, and said hook departing from said first fixing part of said latch member for releasing said latch member;
   wherein when an electronic device is disposed on said carrying surface and against said start-up part, said start-up part drives said start-up member; said start-up member drives said linkage module and said latch member to move towards a first direction; and said latch part projects said supporting surface and hooks to at least one fixing part of said electronic device for carrying and fixing said electronic device on said carrying base;
   wherein said linkage module comprises a scissors mechanism and a first connecting rod; said scissors mechanism connects to said start-up member; said first connecting rod has a first end and a second end; said first end connects pivotally with said scissors mechanism; and said second end connects pivotally with said latch member;
   wherein said scissors mechanism comprises a second connecting rod, a third connecting rod, and a pivot rod; the center of said second connecting rod is disposed at the center of said third connecting rod and arranged in a cross; said second connecting rod and said third connecting rod have a first end and a second end, respectively; said pivot rod is connected with said second end of said second connecting rod and said second end of said third connecting rod;
   wherein said first end of said second connecting rod and said first end of said third connecting rod have a second positioning part, respectively; and said second positioning parts disposes at two limiting parts of said carrying base, respectively.

2. The carrying structure for carrying electronic device of claim 1, and further comprising a first elastic member connected with said latch member and said carrying base for driving said latch member to restore to the original position.

3. The carrying structure for carrying electronic device of claim 2, and further comprising at least one first guiding member disposed on an inner surface of said carrying base, having at least one first guiding part, at least one first positioning part of said latch member disposed at said first guiding part, and said first guiding part guiding said first positioning part for guiding the moving position of said latch member.

4. The carrying structure for carrying electronic device of claim 3, and further comprising at least one second guiding member disposed at said carrying base, located in said accommodating space, and having at least two guiding parts, at least one start-up positioning part of said start-up member and a latch positioning part of said latch member disposed at said corresponding second guiding parts, respectively, and said second guiding parts guiding said start-up positioning part and said latch positioning part for limiting the moving positions of said start-up member and said latch member.

5. The carrying structure for carrying electronic device of claim 1, and further comprising:
   a first buckle member disposed in said accommodating space, connected pivotally to said carrying base, and having at least one hook hooking at least one first fixing part of said latch member; and
   a releasing member disposed at said carrying base, against said first buckle member, pushing said first buckle member, and said hook departing from said first fixing part of said latch member for releasing said latch member.

6. The carrying structure for carrying electronic device of claim 5, and further comprising a second elastic member connected with said first buckle member and said carrying base for driving said first buckle member to restore to the original position.

7. The carrying structure for carrying electronic device of claim 1, and further comprising a first elastic member connected with said latch member and said carrying base for driving said latch member to restore to the original position.

8. The carrying structure for carrying electronic device of claim 7, and further comprising at least one first guiding member disposed on an inner surface of said carrying base, and having at least one first guiding part, at least one first positioning part of said latch member disposed at said first guiding part, and said first guiding part guiding said first positioning part for guiding the moving position of said latch member.

9. The carrying structure for carrying electronic device of claim 8, and further comprising at least one second guiding member disposed at said carrying base, located in said accommodating space, and having at least two second guiding parts, at least one start-up positioning part of said start-up member and a latch positioning part of said latch member disposed at said corresponding second guiding parts, respectively, and said second guiding parts guiding said start-up positioning part and said latch positioning part for limiting the moving positions of said start-up member and said latch member.

10. The carrying structure for carrying electronic device of claim 1, and further comprising a second elastic member connected with said first buckle member and said carrying base for driving said first buckle member to restore to its original position.

11. The carrying structure for carrying electronic device of claim 1, and further comprising a first elastic member connected with said latch member and said carrying base for driving said latch member to restore to its original position.

12. The carrying structure for carrying electronic device of claim 11, and further comprising at least one first guiding member disposed on an inner surface of said carrying base, and having at least one first guiding part, at least one first positioning part of said latch member disposed at said first guiding part, and said first guiding part guiding said first positioning part for guiding the moving position of said latch member.

13. The carrying structure for carrying electronic device of claim 12, and further comprising at least one second guiding member disposed at said carrying base, located in said accommodating space, and having at least two second guiding parts, at least one start-up positioning part of said start-up member and a latch positioning part of said latch member disposed at said corresponding second guiding parts, respectively, and said second guiding parts guiding said start-up positioning part and said latch positioning part for limiting the moving positions of said start-up member and said latch member.

14. The carrying structure for carrying electronic device of claim 1, and further comprising:
   a first buckle member disposed in said accommodating space, and connected pivotally to said carrying base, and having at least one hook hooking at least one first fixing part of said latch member; and
   a releasing member disposed at said carrying base, against said first buckle member, pushing said first buckle member, and said hook departing from said first fixing part of said latch member for releasing said latch member.

15. The carrying structure for carrying electronic device of claim 14, and further comprising a second elastic member connected with said first buckle member and said carrying base for driving said first buckle member to restore to the original position.

16. The carrying structure for carrying electronic device of claim 14, and further comprising a second buckle member disposed at said carrying base, and turned and wedged to a second fixing part of said latch member for fixing the position of said latch member.

* * * * *